J. H. BOURGON.
MEANS FOR VENTILATING AUTOMOBILES.
APPLICATION FILED JULY 19, 1919.

1,361,673.

Patented Dec. 7, 1920.
2 SHEETS—SHEET 1.

INVENTOR
Joseph H. Bourgon
BY
Steuart Perry
ATTORNEYS

J. H. BOURGON.
MEANS FOR VENTILATING AUTOMOBILES.
APPLICATION FILED JULY 19, 1919.

1,361,673. Patented Dec. 7, 1920.
2 SHEETS—SHEET 2.

INVENTOR
Joseph H. Bourgon
BY
Newarlo Perry
ATTORNEYS

UNITED STATES PATENT OFFICE.

JOSEPH H. BOURGON, OF DETROIT, MICHIGAN, ASSIGNOR TO THE STUDEBAKER CORPORATION, A CORPORATION OF NEW JERSEY.

MEANS FOR VENTILATING AUTOMOBILES.

1,361,673.     Specification of Letters Patent.     Patented Dec. 7, 1920.

Application filed July 19, 1919. Serial No. 312,049.

*To all whom it may concern:*

Be it known that I, JOSEPH H. BOURGON, a subject of George V, King of Great Britain and Ireland, residing at Detroit, county of Wayne, and State of Michigan, have invented a certain new and useful Means for Ventilating Automobiles, of which the following is a specification.

This invention embodies means of ventilating automobiles, and has to do, more particularly, with a novel construction of that portion of the machine, forwardly of the driver's seat, whereby it may be efficiently ventilated.

It is common practice to build cars with wind shields positioned above the cowl for the purpose of deflecting the air upwardly so that the occupants of the front seat will be protected from the swift moving currents of air incident to the rapid propulsion of the car. These wind shields are usually made in sections, adapted to be tilted so as to deflect the major portion of the air in a direction away from the occupants of the car, but to allow sufficient air to be diverted into the car to secure proper ventilation therein. While this method of ventilation is fairly satisfactory, so far as concerns those parts of the car positioned above the cowl, yet that portion of the car body beneath the cowl and back of the instrument board is not ventilated to any appreciable extent from the wind shield. This is quite a serious disadvantage, as the said portion of the car, because of its close proximity to the engine, becomes uncomfortably warm for the feet of the occupants of the front seat. This is frequently the case on summer days after the engine has been running for some little time.

Numerous attempts have been made to overcome such uncomfortable temperature beneath the cowl, and in some makes of cars the side doors in the fore part of the body are provided with hooks of a special construction which serve to hold the fore doors partially open to the end that the heat from the engine, rearwardly of the cowl, may be carried off. This arrangement, while of some assistance in obviating the excessive heat, is by no means efficient in keeping down the temperature to that of the normal atmosphere, and, accordingly, there has been a pronounced demand for simple efficient means for accomplishing this result. With the foregoing in mind, the object of the present invention, from a more specific standpoint, is to provide means whereby the forward portion of the car, both above and below the cowl, may be properly ventilated, and to embody such means in automobile construction in a simple and efficient manner.

Features of the invention, other than those specified, will be apparent from the hereinafter detailed description taken in conjunction with the accompanying drawings and appended claims.

The drawings illustrate one practical embodiment of the invention, but the construction therein shown is to be understood as illustrative, only, and not as defining the limits of the invention.

Figure 1:
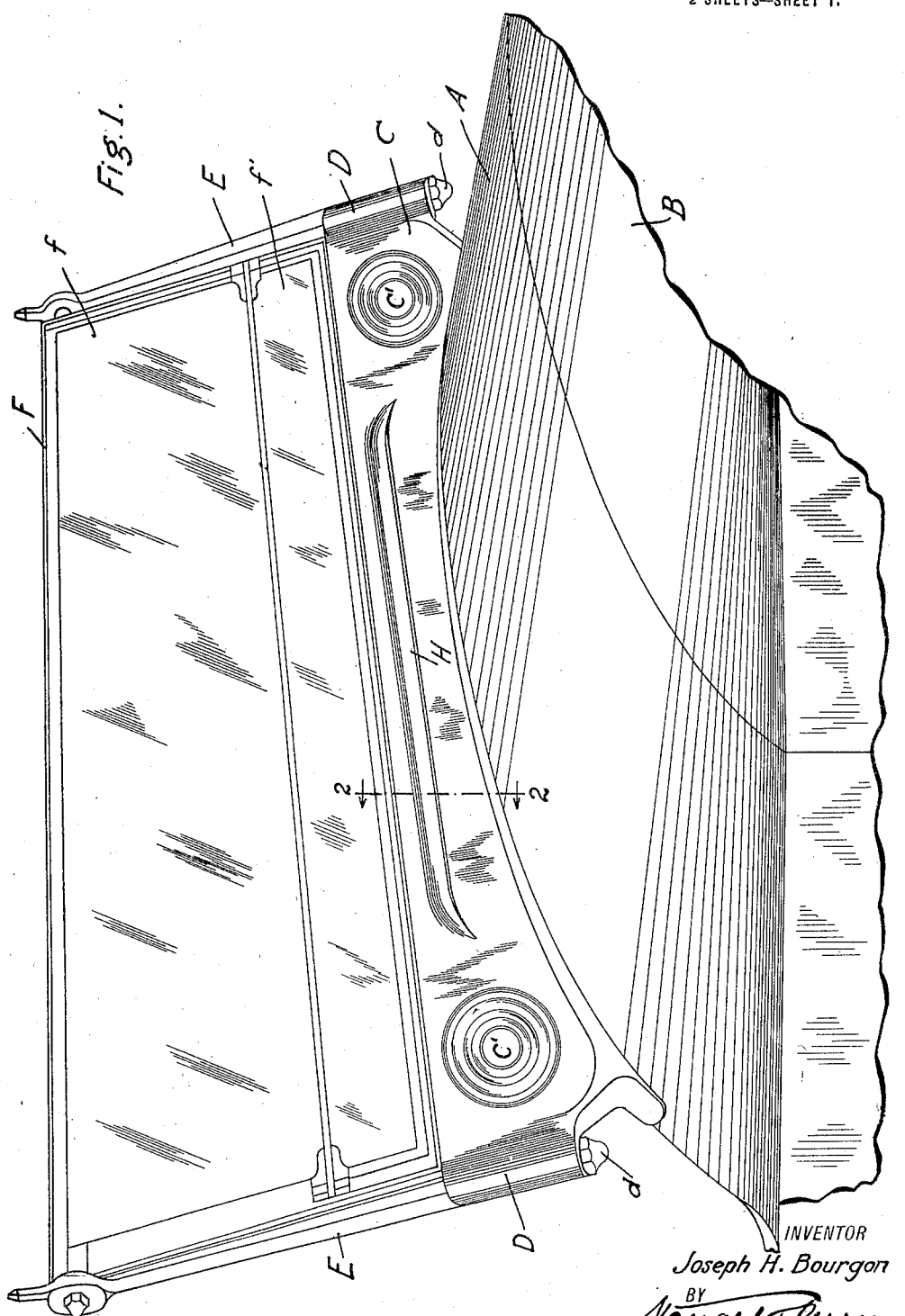
Figure 1 is a fragmental, perspective view of the fore portion of an automobile showing the present invention as applied thereto.

Referring to the drawings and particularly to Fig. 1 wherein a portion of the front of an automobile is illustrated, A designates the cowl and B the hood of the car. Superimposed upon the cowl near the rear edge thereof and extending transversely of the car is positioned a plate C which, in practice, is usually in the form of an aluminum casting. The lower edge of plate C conforms in contour to the shape of the cowl and is rigidly secured thereto by any suitable means such as bolts or rivets, while the upper edge of the said plate is preferably straight as shown. At either end of the plate, sockets D are provided in which are adapted to seat the stems of upstanding arms E, which are secured to the sockets D by bolts $d$. The upstanding arms E form a support for a wind shield F of the well known divided pivoted type adapted to be tilted at various angles at the will of the chauffeur, so that the upper portion $f$ of said wind shield will deflect the air upwardly while the lower portion $f'$ thereof may be moved to a position to deflect a portion of the air either upwardly or downwardly and into the body of the car for the purpose of partially ventilating the same. The plate C may, if desired, carry lamps $c'$, as shown.

Figure 2:
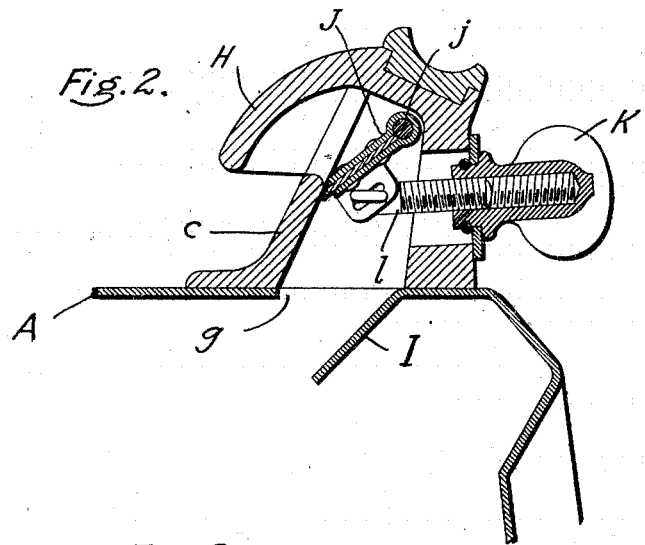
Figs. 2 and 3 are sections on the line 2—2 of Fig. 1, showing the operating parts of the device in different positions, and, Fig. 4 is an elevation of a portion of the device as viewed from the driver's seat.
Figure 3:
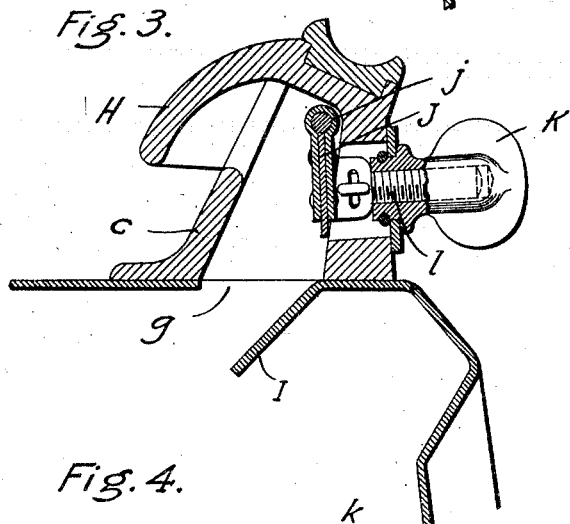
Figure 4:
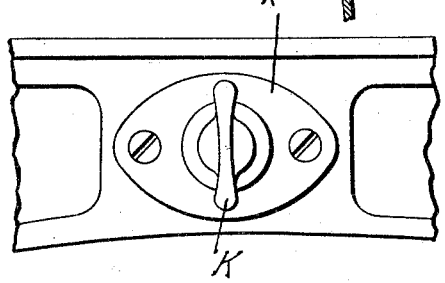

The plate C is mounted on the cowl A directly over a slot *g* formed in said cowl and extending transversely thereof and said plate C is cast hollow as shown in Figs. 2 and 3, so as to provide an interior chamber the outlet of which is through the slot *g* of the cowl. Formed on the forward face *c* of the plate C, which is preferably inclined, is a lip or deflector H and beneath this lip the front wall of the plate is cut away to form an inlet to the interior of the plate. With this construction it will appear that as the car travels along, air impinging the lower portion of the front of the plate C will be deflected upwardly by the forward inclined face *c* of said plate and against the inner face of the deflector or lip C, whence it will be caused to pass through the chamber of the plate C and through the slot *g* of the cowl downwardly beneath the cowl and rearwardly of the dash. The cowl is provided, as usual, with an open back and beneath the cowl and on the dash are positioned the instruments, so that air passing into the space below the cowl, as described, will thoroughly ventilate the same by setting up strong air currents which will free this space of engine heat. In order that the air may be properly distributed beneath the cowl, a deflector plate I is preferably provided and this deflector plate may be hinged for adjustment or formed rigid with the cowl as shown.

In winter time, or in more or less chilly weather, the heat from the engine beneath the cowl is a comfort rather than a discomfort and the presence of a strong draft, such as would result from the flow of air through the plate C would be objectionable. Accordingly, means is provided to regulate or preclude ventilation through the plate C when desired. To this end a damper J is pivoted on a rod *j* and may be moved from the open position of Fig. 3 to the closed position of Fig. 2, and vice versa, through the manipulation of a knob or finger piece K, which as shown is mounted for rotation in a plate *k* screwed to the rear face of the plate C. The knob K is made hollow and is tapped and threaded interiorly as shown. Into such threaded interior extends a threaded stem *l* of the damper J so that through rotation of the knob the stem *l* of the damper is advanced or retracted to open or close the same as desired.

It will thus appear that through the manipulation of the wind shield and the damper J, the occupants of the car can, at will, ventilate the same in accordance with their desires, and it will be further noted that practically all of the mechanism for accomplishing this result is mounted on or forms part of the plate C. This is of particular importance from the standpoint of manufacture since it allows of the construction of such plate with all the parts attached and of the subsequent bodily mounting of the entire ventilating means through the application of a few screws or rivets. This results in efficiency and economy in manufacture.

It will be understood that mechanical and formal changes may be made in the structure described, such as the substitution of equivalents, without departing from the spirit or substance of the invention, the scope of which is commensurate with the appended claims.

Having thus fully described the invention, what I claim as new, and desire to secure by Letters Patent is:

1. In an apparatus for ventilating the forward part of an automobile body, an integral casting adapted to be mounted atop the cowl of the body and extend transversely thereof, said casting providing means for supporting a superimposed wind shield and being cored out to provide a conduit leading from the forward face of the casting, above the hood, to an aperture formed in the cowl, whereby the movement of the automobile effects a circulation of air through said conduit and through the aperture in the cowl, into the forward part of the body below the cowl.

2. In an apparatus for ventilating the forward part of an automobile body, an integral casting adapted to be mounted atop the cowl of the body and extend transversely thereof, said casting providing means for supporting a superimposed wind shield and being cored out to provide a conduit leading from the forward face of the casting, above the hood, to an aperture formed in the cowl, whereby the movement of the automobile effects a circulation of air through said conduit and through the aperture in the cowl, into the forward part of the body below the cowl, and a shield formed integral with the casting and overhanging the open forward end of the conduit to shed water that might otherwise be driven into said conduit.

3. A device for supporting the wind shield of an automobile and for furnishing ventilation to that portion of the automobile lying beneath the cowl, comprising a member formed to fit over the cowl in a direction transverse of the cowl and adapted to be secured to the cowl adjacent the rear thereof, said member being provided with means to support a wind shield and also provided with a conduit located centrally and longitudinally of said member and leading through the same, one terminus of said conduit being toward the forward end of the automobile and the other terminus registering with a corresponding aperture in the cowl.

4. A device for supporting the wind shield of an automobile and for furnishing ventilation to that portion of the automobile lying beneath the cowl, comprising a member formed to fit over the cowl in a direction transverse of the cowl and adapted to be secured to the cowl adjacent the rear thereof, said member being provided with means to support a wind shield and also provided with a conduit located centrally and longitudinally of said member and leading through the same, one terminus of said conduit being toward the forward end of the automobile and the other terminus registering with a corresponding aperture in the cowl, and an overhanging shield associated with the inlet end of the conduit facing the forward end of the automobile to shed water that might otherwise be driven into said conduit.

5. A device for supporting the wind shield of an automobile and for furnishing ventilation to that portion of the automobile lying beneath the cowl, comprising a member formed to fit over the cowl in a direction transverse of the cowl and adapted to be secured to the cowl adjacent the rear thereof, said member being provided with means to support a wind shield and also provided with a conduit located centrally and longitudinally of said member and leading through the same, one terminus of said conduit being toward the forward end of the automobile and the other terminus registering with a corresponding aperture in the cowl, a damper interposed in said conduit to control the flow of air therethrough, and means to control said damper.

6. A device for supporting the wind shield of an automobile and for furnishing ventilation to that portion of the automobile lying beneath the cowl, comprising a member formed to fit over the cowl in a direction transverse of the cowl and adapted to be secured to the cowl adjacent the rear thereof, said member being provided with means to support a wind shield and also provided with a conduit located centrally and longitudinally of said member and leading through the same, one terminus of said conduit being toward the forward end of the automobile and the other terminus registering with a corresponding aperture in the cowl, an overhanging shield associated with the inlet end of the conduit facing the forward end of the automobile to shed water that might otherwise be driven into said aperture, a damper interposed in said conduit to control the flow of air therethrough, and means to control said damper.

Signed by me at Detroit this 15th day of July 1919.

JOSEPH H. BOURGON.

Witnesses:
O. H. CLARK,
E. J. CLOUTIER.